United States Patent Office 3,804,736
Patented Apr. 16, 1974

3,804,736
PHOTOPOLYMERIZABLE POLYESTER COMPOSITIONS
George Pasternack, Chicago, Ill., assignor to Continental Can Company, Inc., New York, N.Y.
No Drawing. Filed Oct. 12, 1971, Ser. No. 188,573
Int. Cl. C08d 1/00; C08f 1/16
U.S. Cl. 204—159.23      12 Claims

ABSTRACT OF THE DISCLOSURE

A photopolymerizable composition comprised of a mixture of (1) a polyacrylate prepared by reacting (a) a polyacetate condensation product of a polyester having an excess of hydroxyl groups and a substituted acetic acid having the formula $$X-CH_2-\overset{\overset{\displaystyle O}{\|}}{C}-O-H$$

where X is an electron withdrawing group and (b) an aldehyde having the formula R—CHO where R is hydrogen, alkyl, aryl or furyl, the polyester being prepared from the condensation of a saturated polyhydric alcohol and a saturated dicarboxylic acid, (2) a polymerizable unsaturated polyester prepared from a polyhydric alcohol and an alpha, beta-ethylenically unsaturated monocarboxylic acid and (3) a photosensitizer such as a chlorinated polyphenyl.

The photopolymerizable compositions are useful in the preparation of vehicles for printing inks which when printed on a substrate dry rapidly to a non-offsetting condition under irradiation with ultraviolet light.

BACKGROUND OF THE INVENTION

(1) Field of the invention

This invention relates to photopolymerizable compositions and more particularly to photopolymerizable compositions which are useful as printing ink vehicles which undergo rapid drying on exposure to ultraviolet radiation.

(2) The prior art

Printing or decorating metal substrates is conventionally accomplished using inks composed predominantly of a drying oil vehicle pigmented to the desired color which dry by absorbing oxygen from the surrounding air. This type of ink requires a considerable time to dry.

In the outside decoration of a metal container, such as a can body, the printing ink is applied to flat metal sheets and the printed sheets are stacked to await fabrication into a can. Since in the decoration operation the freshly printed sheet travels only for a few seconds and/or feet before it is stacked, the chances for offsetting of the ink from the printed to the unprinted sides of the stacked sheet are considerable. Offsetting is very undesirable since it ruins the appearance of the printed work. Smearing and smudging of the slowly drying ink is also encountered where successive printing runs with different colored inks are to be made on the same sheet surface to prepare a multi-color decoration.

In addition to the problem of offsetting, conventional printing inks prepared with drying oil vehicles also contain a substantial amount of a volatile organic solvent which must be removed as the ink dries. The evaporation of the solvent creates an air pollution problem which many present day communities will not tolerate.

One method of avoiding the use of solvents in preparing printing ink vehicles which has been attempted by the art is to prepare the vehicle from a drying oil or other unsaturated composition of suitable viscosity which can be polymerized and dried by exposure to ultraviolet radiation as for example, U.S. 2,453,769, 2,453,770, 3,013,895, 3,051,591, 3,326,710, and 3,511,710. These vehicle compositions have only been partly successful as the photosensitizers and catalysts incorporated in the vehicles to maximize the responsiveness of the vehicle composition to ultraviolet radiation either cause premature gelation of the composition or are mostly chemicals whose incorporation in the vehicle increase the cost of the vehicle to a point wherein the ink is too costly for commercial printing operations.

SUMMARY OF THE INVENTION

In accordance with the present invention, there is provided a photopolymerizable composition useful as a printing ink vehicle which is stable and can be stored for a long period of time under ordinary conditions and which dries rapidly upon irradiation with ultraviolet light to a hard insoluble film, which composition is comprised of a mixture (1) a polyacrylate prepared by reacting (a) a polyacetate condensation product of a polyester having an excess of hydroxyl groups and a substituted acetic acid having the formula $$X-CH_2\overset{\overset{\displaystyle O}{\|}}{C}-OH$$

where X is an electron withdrawing group (b) an aldehyde having the formula RCHO where R is hydrogen, alkyl, aryl or furyl, the polyester being prepared from the condensation of a polyhydric alcohol and a saturated dicarboxylic acid, (2) a polymerizable, unsaturated polyester prepared from a polyhydric alcohol and an alpha, beta-ethylenically unsaturated monocarboxylic acid and (3) a photosensitizer.

Printing inks prepared using the compositions of this invention as vehicles exhibit excellent adhesion to a variety of substrates. Printed impressions made with these inks on metal sheet substrates and exposed to ultraviolet light for several seconds become sufficiently dry so that the problem of offsetting on successive sheets coming from a printing press is avoided. As no volatile solvents are employed in the preparation of the ink vehicles the environmental pollution problem encountered with these solvents is also avoided.

PREFERRED EMBODIMENTS

The polyacrylate component of the present invention is obtained by first preparing a polyester prepolymer having residual hydroxyl groups by the condensation of a saturated dicarboxylic acid having 3 to 12 carbon atoms with a molar excess of an aliphatic polyhydric alcohol having 3 to 8 hydroxyl groups. The polyhydric alcohol is generally reacted with the dicarboxylic acid at a mole ratio of alcohol to acid of about 1.1:1 to about 2:1 and a mole ratio of alcohol to acid of 1.2:1 to 1.7:1 being preferred. The molecular weight of the polyester prepolymer obtained generally ranges from about 700 to 2,000.

Illustrative of saturated aliphatic dicarboxylic acids which may be used to prepare the polyester prepolymer component include malonic, succinic, adipic, suberic, azelaic, sebacic, pimelic and glutaric acids. Suitable examples of aliphatic polyhydric alcohols which may be employed to prepare the polyester prepolymer includes glycerol, trimethylolethane, trimethylolpropane, pentaerythritol, dipentaerythritol, and tripentaerythritol.

If desired, minor amounts, e.g. about 5–10 mole percent based on the reactants of an unsaturated monocarboxylic acid having 10 to 20 carbon atoms such as oleic, linoleic, linolenic, palmitoleic, dec-9-enoic and gadoleic acids may be included in the polyester prepolymer reaction mixture to render the polyacrylate coating heat sensitive if post baking of the ultraviolet cured coating is to be effected.

Condensation of the polyhydric alcohol and dicarboxylic acid is effected by admixing the polyhydric alcohol and dicarboxylic acid and heating the mixture at 100° to 200° C. for about 2 to 15 hours. Preferably the reaction is carried out under reflux conditions (at either atmospheric or reduced pressure) so that the water of condensation may be removed from the reaction system by azeotropic distillation. The reaction is continued so long as water of reaction is evolved.

By utilizing a molar excess of the polyhydric alcohol in the condensation reaction a polyester is obtained containing excess hydroxyl groups which is then reacted with a substituted acetic acid having the structural formula

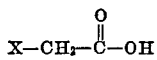

where X is an electron withdrawing group such as nitro (—NO$_2$), cyano (—CN), and the like to prepare a polyacetate having reactive alpha hydrogens. Suitable examples of such substituted acetic acids are nitroacetic acid and cyanoacetic acid. The substituted acetic acid is reacted with the hydroxyl group containing polyester prepolymer at 100° to 120° C. for 1 to 15 hours to prepare a polyacetate using at least a stoichiometric amount of substituted acetic acid required to react and condense with the unreacted hydroxyl groups of the polyester. The reaction of the substituted acetic acid and the polyester may be represented by the following equation:

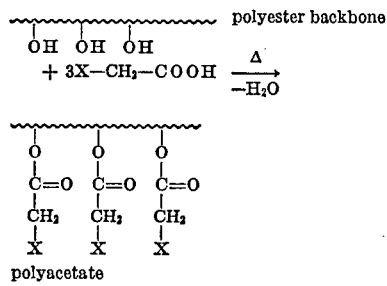

The polyacrylate is then prepared by reacting the polyacetate with an aldehyde represented by the formula

where R is hydrogen, aryl, furfuryl, or an alkyl radical having 1 to 10 carbon atoms. Suitable examples of such aldehydes include formaldehyde, acetaldehyde, propionaldehyde, 2-ethylbutyraldehyde, butyraldehyde, furfurylaldehyde, phenylaldehyde and the like.

The reaction of the aldehyde and the polyacetate is carried out by mixing substantially equal molar amounts of the aldehyde with respect to the acetate groups present in the polyacetate and heating the mixture, with the removal of the water of condensation, under azeotropic conditions at a temperature between about 70° and 85° M. until the aldehyde is consumed.

Reaction of the aldehyde and the polyacetate may be accelerated by use of a small proportion, such as 0.01 to 0.1% by weight based on the polyacetate of an alkaline catalyst including amines such as ethyl amine, butyl amine, pyridine piperidine amino acids and potassium fluoride. The condensation reaction between the polyacetate and aldehyde to prepare the polyacrylate component may be represented by the equation:

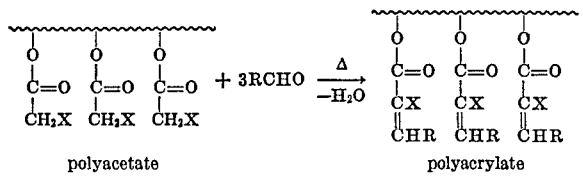

The polymerizable unsaturated polyester component of the present invention is prepared from a polyhydric alcohol having from 2 to 6 hydroxyl groups and an alpha, beta-ethylenically unsaturated monocarboxylic acid having from 3 to 6 carbon atoms, generally 50 to 100 percent of the hydroxyl groups being esterified with the ethylenically unsaturated monocarboxylic acid. Illustrative polyhydric alcohols which may be used to prepare the unsaturated polyester include ethylene glycol, propylene glycol, diethyleneglycol, butanediol, trimethylolethane, trimethylolpropane, trimethylolhexane, glycerol, mannitol, pentaerythritol and mixtures of these polyhydric alcohols. Unsaturated monocarboxylic acids which may be reacted with the polyhydric alcohols to prepare the unsaturated polyesters include acrylic acid, methacrylic acid and ethacrylic acid. Examples of suitable unsaturated polyesters include ethylene glycol diacrylate, diethylene glycol dimethacrylate, butanediol, diacrylate, trimethylolpropane triacrylate, trimethylolhexane trimethacrylate, sorbitol tetraacrylate, mannitol tetraacrylate, pentaerythritol tetracrylate, and pentaerythritol triacrylate.

Photosensitizers useful in the practice of the present invention include chlorinated polyphenyl compounds and organic carbonyl compounds having an $\alpha,\beta$ unsaturated carbonyl group such as benzophenone, anthraquinone, ethylanthraquinone and benzoin methyl ether.

Chlorinated polyphenyl compounds are preferred photosensitizer compounds. Examples of chlorinated polyphenyl compounds suitable for use in the compositions of the present invention are chlorinated biphenyls and triphenyls which contain from about 30 to 70% weight of chemically combined chlorine. The pure compounds formed by chlorination of biphenyl or triphenyl are crystalline compounds; however mixtures containing a number of such compounds are either liquids or resins. Useful compositions include liquid mixtures of chlorinated polyphenyls having an average chlorine content of about 50 to 65%. The resinous materials, which include chlorinated biphenyls containing about 60 to 70% combined chlorine, chlorinated triphenyls containing about 40 to 60% chlorine, and blends of chlorinated biphenyls and triphenyls having an average chlorine content of about 75%, are also employed in the compositions of the present invention.

Chlorinated polyphenyls are available commercially and include polyphenyl compounds manufactured by the Monsanto Chemical Company and sold under the trade name "Aroclors." For example Aroclor 1232 is a chlorinated biphenyl having a chlorine content of 32 percent and a specific gravity of 1.270. "Aroclor 1254" is a chlorinated biphenyl having a chlorine content of 54% and a specific gravity of 1.505. "Aroclor 4465" is a 60:40 blend of chlorinated biphenyls and chlorinated triphenyls having a chlorine content of 65 percent, a specific gravity of 1.670 and a softening point of 45°–52° C. Aroclor 5460 is a chlorinated triphenyl having a chlorine content of 58.5 to 60%, a softening point of 98 to 105° C. and a specific gravity of 1.670.

Printing ink vehicles prepared from the compositions of present invention are comprised of 5 to 50% by weight, and preferably 10 to 30% by weight polyacrylate, 30 to 60% by weight and preferably 40 to 50% by weight of the polymerizable unsaturated polyester and 1 to 40% by weight and preferably 3 to 30% by weight of the photosensitizer.

In general, printing inks prepared using the compositions of the present invention as vehicles are prepared in the same manner as conventional printing inks only using the vehicle components as disclosed herein.

Coloring compounds used in preparing the ink compositions of the present invention are dyes and pigments. Examples of these compounds are pigments such as cadmium yellow, cadmium red, cadmium maroon, black iron oxide, titanium dioxide, chrome green, gold, silver, aluminum and copper; and dyes such as alizarine red, Prussian blue, auramin naphthol, malachite green and the like. Ordinarily the concentration of pigment or dye is present in the ink vehicle in a weight percent of from about 30 to 60%.

In addition to the coloring compounds set forth above, printing inks of the present invention may contain any of the conventional additives used in inks. The ink may contain the conventional antioxidants including phenolic substances such as 2,6-ditertiarybutyl-4-methylphenol, hydroquinone and resorcinol, aromatic amines such as diphenylamine and metal salts such as stannous chloride.

In printing metal surfaces with printing inks prepared using the compositions of the present invention as vehicles, the ink is applied using a printing press conventionally used for printing on a metal substrate. Conventional printing processes leave on the surface of the metal substrate a printed layer of approximately 0.1 to 0.2 mil thickness.

Once the metal substrate, generally in the form of a sheet, is printed, the substrate is positioned to pass under a source of ultraviolet light to dry the ink. In most instances, the ultraviolet light source is maintained at about 0.5 to about 5 inches from the printed substrate undergoing irradiations.

Rapid drying of the ink is effected within a 2 to 5 second period using ultraviolet light emitted from an artificial source having a wavelength in the range between 4000 A. and 1800 A. The output of commercially available ultraviolet lamps or tubes can vary between 100 watt./in. to 200 watt/in. of lamp surface.

High pressure mercury vapor discharge lamps in quartz are the preferred source of ultraviolet light. Medium-pressure mercury vapor discharge tubes in quartz may be employed if desired.

As regards any particular conditions of source and distance, the duration of the irradiation treatment can be determined by a few trials.

The following examples will further illustrate the practice of the invention.

EXAMPLE I

Preparation of a polyester (trimethylolpropane azelate-TMP) containing residual hydroxyl groups To a one liter, three-necked flask equipped with a motor driven stirrer, barret trap, reflux condenser, thermometer and gas inlet tube was charged 282 grams (1.5 moles) of azelaic acid, 268 grams (2.0 moles) of trimethylolpropane and 70 milliliters of toluene. The contents of the flask were stirred under a nitrogen atmosphere and heated to 150° C. This temperature was maintained for 4.5 hours while 45 ml. (2.5 moles) of water was collected from the refluxing azeotropic toluene-water mixture. An additional 5 ml. (about 0.3 mole) of water was removed after heating at 190° C. for 1.5 hours. The molecular weight (MW) of the polyester reaction product as determined by gel permeation chromatography was 1,200.

Preparation of polycyanoacetate

The contents of the flask from the polyester preparation were cooled to approximately 100° C., diluted with 100 ml. of benzene, and 280 g. (3.3 moles) of cyanoacetic acid was added. Heating was continued and the amount of the solvent adjusted so that the contents of the flask were maintained at a constant refluxing temperature of 115° C. These conditions were continued for 16 hours until 48 ml. (about 2.7 moles) of water was collected. After cooling to room temperature, the contents of the flask were slowly stirred into 800 ml. of methanol contained in a two liter beaker. The polyacetate reaction product settled to the bottom of the beaker as a heavy oil and was washed with two more 800 ml. portions of methanol. Upon removal of the solvent in vacuo, 627 g. (90% yield) of a various syrup, light yellow polycyanoacetate was obtained having a MW of 6,200.

Preparation of polyacrylate containing pendant β-phenyl α-cyanoacrylate groups

A solution containing 67 g. (0.25 mole cyanoacetate groups) of polycyanoacetate prepared above, 0.65 g. (5×10⁻³ mole) of ε-aminocaproic acid, 26 g. (0.25 mole) of benzaldehyde and 5 ml. of glacial acetic acid in 80 ml. of benzene was placed in a 500 ml. three-necked flask equipped with a reflux condenser, barret trap, thermometer and motor driven stirrer. The contents of the flask were heated and refluxed at 80° C. for about 15 minutes with the removal of sufficient water to indicate the reaction was completed. The contents of the flask were then slowly stirred into 500 ml. of methanol contained in a 1500 ml. beaker and the product settled out as a heavy oil. The product was purified by alternatively dissolving it in a minimum amount of benzene followed by reprecipitation in 500 ml. of methanol. After removal of the solvent in vacuo 84 grams (95% yield) of a light yellow, semi-solid polycyanoacrylate was obtained having a MW of 10,500. The presence of the benzylidene groups was established by nuclear magnetic resonance spectroscopy.

A series of unpigmented ink vehicles were prepared using the polycyanoacrylate prepared above in admixture with pentaerythritol tetraacrylate (PETA) and a chlorinated triphenyl (Arochlor 5460).

For purposes of contrast ink vehicle compositions were prepared wherein the TMP-polyester and polycyanoacetate compositions prepared above were substituted for the polycyanoacrylate in the vehicle composition. The composition of the polycyanoacrylate containing vehicles as well as the contrasting TMP-polyester, polycyanoacetate containing vehicles (designated by the symbol C) are summarized in Table I below.

TABLE I

| Ink vehicle | A | B | C1 | C2 | C3 | C4 |
|---|---|---|---|---|---|---|
| Components, parts by weight: | | | | | | |
| Polycyanoacrylate | 10 | 20 | | | | |
| TMP-polyester | | | 10 | 20 | | |
| Polycyanoacetate | | | | | 10 | 20 |
| PETA | 60 | 50 | 60 | 50 | 60 | 50 |
| Chlorinated triphenyl | 30 | 30 | 30 | 30 | 30 | 30 |

The ink vehicles were applied as a film coating to the surface of 5 x 3 inch steel plate of the type used in the manufacture of metal cans.

After application of the coating, the coated plates were placed on a continuously moving conveyor which passed under a bank of three 12 inch, high pressure mercury lamps mounted parallel to each other. The radiation emitted by the lamps was approximately 100 watts/in. of lamp surface. The conveyor was adjusted so that the coated plates traveled under the surface of the ultraviolet lamp bank so that the plates were 1.0 inch from the lamp surface. The speed of the conveyor belt was adjusted so that the printed plates were exposed to the ultraviolet radiation for about 0.45 second each time the plates were passed under the lamps. The plates were passed under the lamps for a sufficient number of times to effect total drying of the coatings.

Adhesion of the ultraviolet dried films was tested by inscribing an X into the dried film with a sharp nail and then attempting to remove the film around the X with cellophane tape. The results of these adhesion tests were recorded in Table II below.

TABLE II

| Ink vehicle: | No. passes to dry | Seconds | Adhesion |
|---|---|---|---|
| A | 2 | 0.9 | No removal. |
| B | 2 | 0.9 | Do. |
| C1 | 2 | 0.9 | Complete removal. |
| C2 | 3 | 1.35 | Do. |
| C3 | 3 | 1.35 | Do. |
| C4 | 4 | 1.80 | Do. |

EXAMPLE II

The procedure of Example I was repeated to prepare a series of uncoated ink vehicles with the exception that ethyl anthraquinone (EA) or benzoin methyl ether (BME) was substituted for the chlorinated triphenyl photosensitizer. The compositions of these ink vehicles and the adhesion of ultraviolet cured films of these compositions on steel plate is summarized in Table III below.

TABLE III

| Ink vehicle No.: | Parts by weight | | | | Time to dry |
|---|---|---|---|---|---|
| | Polycyanoacrylate | PETA | Photosensitizer (EA) | (BME) | |
| Ink vehicle No.: | | | | | |
| 1 | 10 | 87 | 3 | | 1.35 |
| 2 | 10 | 85 | 5 | | 0.9 |
| 3 | 20 | 78.8 | | 1.2 | 27 |
| 4 | 30 | 65 | | 5 | 1.35 |
| 5 | 40 | 55 | 0 | 5 | 1.35 |

EXAMPLE III

A white ink was prepared on a three-roll mill using 60% titanium dioxide pigment and 40% of an ink vehicle having the following composition:

| | Parts by weight |
|---|---|
| Polycyanoacrylate | 10 |
| PETA | 20 |
| Trimethylolpropanetriacrylate (TMPTA) | 40 |
| Chlorinated triphenyl | 30 |

Using a conventional lithographic technique (ATF Chief 20 A printing press) the white ink was printed upon the surface of 5 x 3 inch steel plates of the type used in the manufacture of metal cans.

After application of the printing, the printed plates were conveyed under a bank of high pressure mercury lamps in the manner of Example I. The speed of the conveyor belt was adjusted so that the printed plates were exposed to the ultraviolet radiation for about 2.7–3.2 seconds which time was sufficient to effect total drying of the printed impression.

The so dried plate was capable of undergoing successive printing operations without smearing and exhibited excellent adhesion to the steel plate before and after ultraviolet drying. Ink transfer from press to plate was comparable to that of conventional heat curing inks.

The stability of the ink, as measured in an inkometer at 90° F. and at a speed of 1200 r.p.m. for ten minutes was constant.

The printing ink vehicle stored in a series of sealed glass containers exhibited no gelation for at least eight weeks.

EXAMPLE IV

A polyacrylate was prepared following the procedure of Example I with the exception that 2-ethylbutyraldehyde was substituted for benzaldehyde in the preparation of the polyacrylate.

A white ink was prepared using 50% titanium dioxide pigment and 50% of an ink vehicle having the following composition:

| | Parts by weight |
|---|---|
| Polycyanoacrylate (of Example IV) | 20 |
| PETA | 20 |
| TMPTA | 30 |
| Chlorinated triphenyl | 30 |

The white ink was printed upon the surface of 5 x 3 inch steel plate and exposed to ultraviolet radiation for 1.0 second in accordance with the procedure of Example III. The dried plate was capable of undergoing successive printing operations without smearing and exhibited excellent adhesion to the steel plate.

EXAMPLE V

The procedure of Example IV was repeated with the exception that the polyester used to prepare the polyacrylate was the condensation product of 1.0 mole TMP, 0.75 mole azelaic acid and 0.25 mole 9-11 linoleic acid.

A white ink was prepared in accordance with the procedure of Example IV with the exception that the polyacrylate of Example V was substituted for the polyacrylate of Example IV in the ink vehicle. The ink was printed on a steel plate and dried using ultraviolet radiation for 1.5 seconds in accordance with Example IV exhibiting no offsetting. Improved abrasion resistance was imparted to the printing by baking the ultraviolet dried plate at 350° F. for 8 minutes.

EXAMPLE VI

The procedure of Example I was repeated with the exception that 24 grams of furfural aldehyde was substituted for benzaldehyde in the preparation of the polycyanoacrylate.

A coating composition prepared from 10 parts of the furfural containing polycyanoacrylate 60 parts PETA and 30 parts of the chlorinated triphenyl dried in 1 second when coated on steel plates and exposed to ulraviolet light in accordance with the procedure of Example I.

What is claimed is:

1. A photopolymerizable composition comprised of a mixture of
   (a) 5 to 50% by weight of a polyacrylate prepared by reacting (i) a polyacetate condensation product of a polyester having an excess of hydroxyl groups and a substituted acetic acid having the structural formula

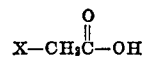

where X is an electron withdrawing group selected from the group consisting of cyano and nitro and (ii) an aldehyde having the formula

where R is selected from the group consisting of hydrogen, alkyl, aryl and furyl, the polyester having been prepared from the condensation of a saturated dicarboxylic acid having 3 to 12 carbon atoms and a molar excess of a polyhydric alcohol having 3 to 8 hydroxy groups;
   (b) 30% to 60% by weight of a polymerizable, unsaturated polyester prepared from a polyhydric alcohol having 2 to 6 hydroxy groups and an alpha, beta-ethylenically unsaturated monocarboxylic acid having 3 to 6 carbon atoms; and
   (c) 1% to 40% by weight of a photosensitizer compound.

2. The composition of claim 1 where R is selected from the group consisting of hydrogen, alkyl, phenyl and furyl.

3. The composition of claim 1 wherein X is cyano.

4. The composition of claim 1 wherein R is phenyl.

5. The composition of claim 1 wherein R is an alkyl group having 1 to 10 carbon atoms.

6. The composition of claim 1 wherein R is furfuryl.

7. The composition of claim 1 wherein the saturated polyester is trimethyolpropane azelate.

8. The composition of claim 1 wherein the unsaturated polyester is pentaerythritol tetraacrylate.

9. The composition of claim 1 wherein the unsaturated polyester is trimethylol propane triacrylate.

10. The composition of claim 1 wherein the photosensitizer is a chlorinated polyphenyl.

11. The composition of claim 1 wherein the photosensitizer is ethylanthraquinone.

12. The composition of claim 1 wherein the photosensitizer is benzoin methyl ether.

(References on following page)

References Cited

UNITED STATES PATENTS

| | | | |
|---|---|---|---|
| 3,060,025 | 10/1962 | Burg et al. | 96—35.1 X |
| 3,100,199 | 8/1963 | Fordham et al. | 260—73 R |
| 3,105,801 | 10/1963 | Bell et al. | 204—159.21 |
| 3,441,632 | 4/1969 | Tanaka et al. | 260—73 R |
| 3,552,986 | 1/1971 | Bassemir et al. | 96—35.1 X |
| 3,677,813 | 7/1962 | Eckert et al. | 260—73 R |
| 3,677,813 | 7/1972 | Eckert et al. | 117—142 |
| 3,635,720 | 1/1972 | Steppan et al. | 96—115 R |
| 3,699,086 | 10/1972 | Moschel et al. | 96—115 R |
| 3,060,025 | 10/1962 | Burg et al. | 96—28 |
| 3,552,986 | 1/1971 | Bassemir et al. | 117—12 |
| 3,100,199 | 8/1963 | Fordham et al. | 260—73 |
| 3,712,871 | 1/1973 | Pasternack | 204—159.19 |
| 2,808,331 | 10/1957 | Unruh et al. | 96—114 |
| 3,722,599 | 3/1973 | Robertson et al. | 260—78.5 N |

JOSEPH L. SCHOFER, Primary Examiner

T. S. GRON, Assistant Examiner

U.S. Cl. X.R.

96—33, 35.1, 115 R, P; 106—22; 204—159.16, 159.19; 260—78.5 N, B, UA, 881, 898